United States Patent
Chiu

(10) Patent No.: US 9,558,137 B2
(45) Date of Patent: Jan. 31, 2017

(54) CARD CONTROL DEVICE AND CONTROL CARD OF COMPUTER SYSTEM HAVING CARD CONTROL DEVICE

(71) Applicant: HON HAI PRECISION INDUSTRY CO., LTD., New Taipei (TW)

(72) Inventor: Yi-Guo Chiu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 578 days.

(21) Appl. No.: 14/078,117

(22) Filed: Nov. 12, 2013

(65) Prior Publication Data

US 2014/0164671 A1 Jun. 12, 2014

(30) Foreign Application Priority Data

Dec. 6, 2012 (TW) .............................. 101145772 A

(51) Int. Cl.
*G06F 13/40* (2006.01)
*G06F 13/42* (2006.01)

(52) U.S. Cl.
CPC ....... *G06F 13/4022* (2013.01); *G06F 13/4291* (2013.01)

(58) Field of Classification Search
CPC .................... G06F 13/4022; G06F 13/4291
See application file for complete search history.

(56) References Cited

U.S. PATENT DOCUMENTS

| | | | | |
|---|---|---|---|---|
| 5,515,539 A * | 5/1996 | Ohashi | ................. | G06F 1/3215 |
| | | | | 713/324 |
| 7,747,883 B2 * | 6/2010 | Hsu | ....................... | G06F 1/3203 |
| | | | | 710/104 |
| 8,799,688 B2 * | 8/2014 | Lin | ........................ | H04L 12/10 |
| | | | | 713/300 |
| 2003/0110323 A1 * | 6/2003 | Togawa | ................ | G06F 1/3203 |
| | | | | 710/15 |
| 2009/0172444 A1 | 7/2009 | Wang | | |
| 2010/0138574 A1 * | 6/2010 | Watanabe | ........... | G06F 13/4081 |
| | | | | 710/108 |
| 2011/0113179 A1 | 5/2011 | Cartes et al. | | |
| 2012/0207208 A1 * | 8/2012 | Wyatt | ...................... | G06F 3/14 |
| | | | | 375/240.01 |

FOREIGN PATENT DOCUMENTS

| | | |
|---|---|---|
| CN | 1069355 A | 2/1993 |
| CN | 1458766 A | 11/2003 |
| CN | 100409209 C | 8/2008 |
| CN | 201804322 U | 4/2011 |
| TW | 200622599 | 7/2006 |
| TW | 200928664 | 7/2009 |
| TW | 201043970 | 12/2010 |

\* cited by examiner

*Primary Examiner* — Nimesh G Patel
(74) *Attorney, Agent, or Firm* — Zhigang Ma

(57) ABSTRACT

A computer system includes at least one mother board and a number of control cards monitored by the motherboard via an $I^2C$ bus. Each control card has a unique ID. The computer system connects one of the control cards to the $I^2C$ bus using a card control device installed in each of the control cards to monitor each of the control cards via the single $I^2C$ bus.

16 Claims, 4 Drawing Sheets

CARD CONTROL DEVICE AND CONTROL CARD OF COMPUTER SYSTEM HAVING CARD CONTROL DEVICE

BACKGROUND

1. Technical Field

Embodiments of the present disclosure relate to apparatuses for controlling control cards of computer systems, and particularly to a card control device and a control card of a computer system having the card control device.

2. Description of Related Art

Motherboards of computers often have a plurality of control cards, such as an audio card, a graphics card, and a network card, installed. To control the control cards of the motherboard, a plurality of inter-integrated circuits ($I^2C$) buses are used to connect the control cards to the motherboard. In addition, a CPU of the motherboard reads data of each control card in real-time via the $I^2C$ buses to monitor a working state of the control cards, which consumes a lot of CPU resources. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
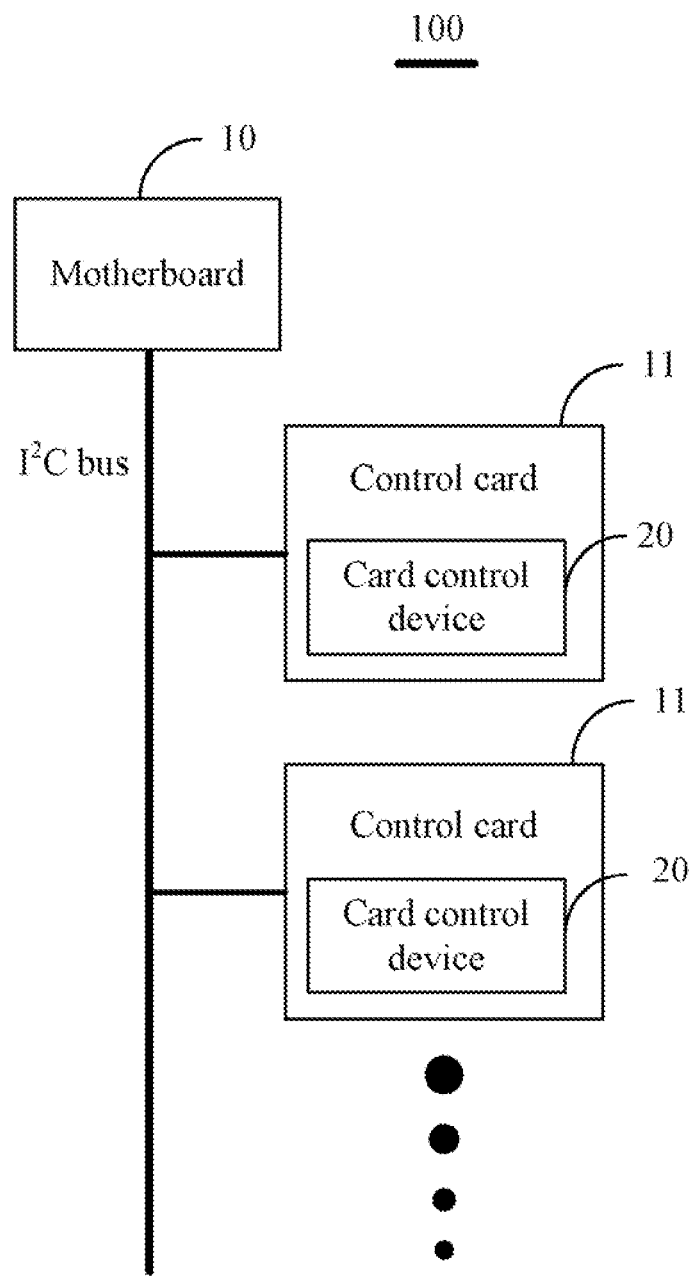
FIG. 1 illustrates a computer system including at least one motherboard and a plurality of control cards.

FIG. 1 shows a computer system 100 including at least one motherboard 10 and a plurality of control cards 11. Each of the control cards 11 is installed on the motherboard 10. In the embodiment, the control cards 11 may include an audio card, a graphics card, and a network card of the computer system 100, for example. Each control card 11 is received in a corresponding card slot of the motherboard 10. The motherboard 10 is connected to each of the control cards 11 via an inter-integrated circuit ($I^2C$) bus. The motherboard 10 monitors each of the control cards 11 via the $I^2C$ bus. Each of the control cards 11 includes a card control device 20 and has a unique device identification (ID). In one embodiment, the unique device ID of each control card 11 is a slot ID of a corresponding slot where the control card 11 is inserted into.

Figure 2:
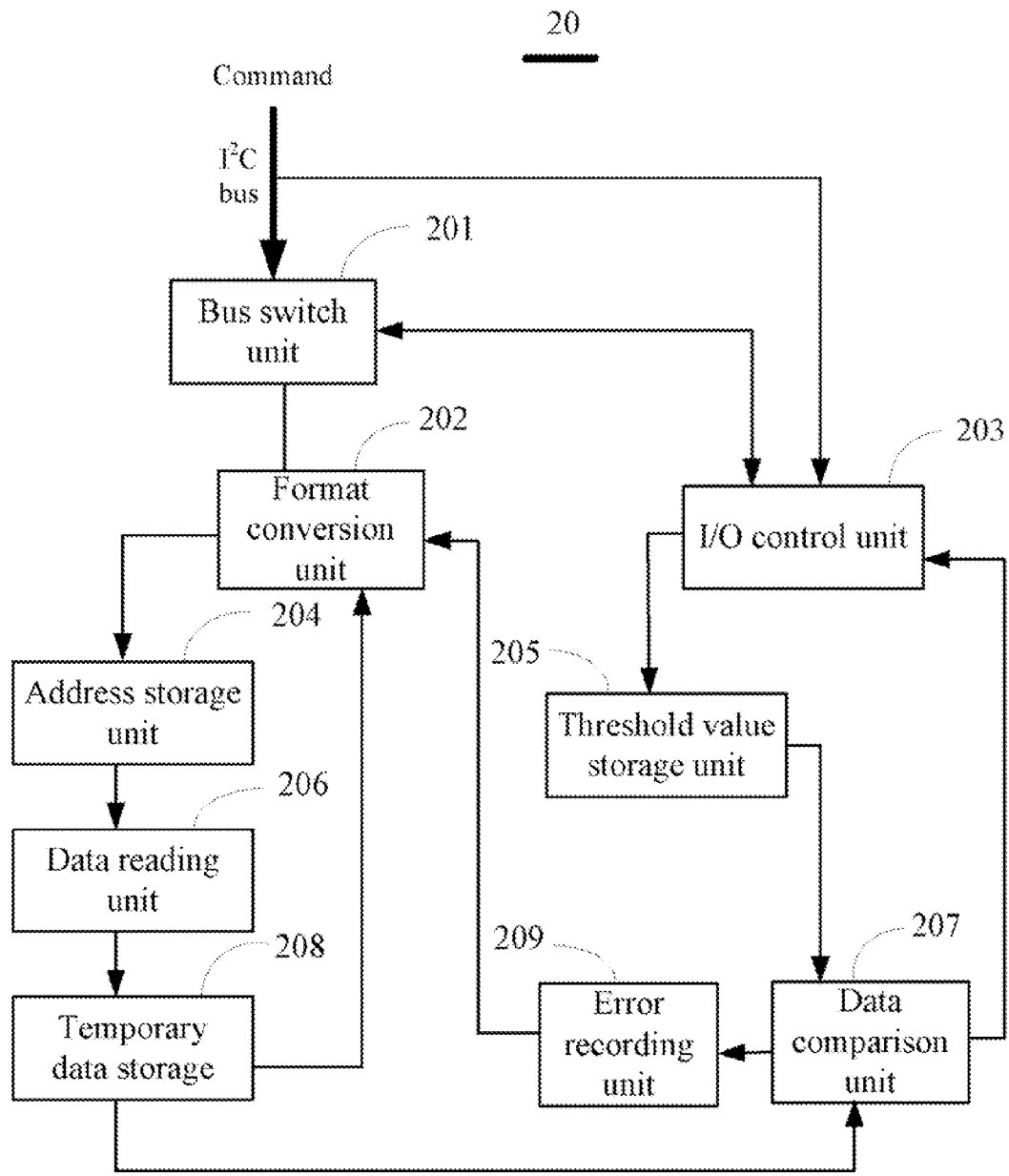
FIG. 2 illustrates a schematic block diagram of a card control device used in each of the control cards of FIG. 1.

FIG. 2 shows a schematic block diagram of the card control device 20 of the control cards 11. In one embodiment, the card control device 20 includes a bus switch unit 201, a format conversion unit 202, an input/output (I/O) control unit 203, an address storage unit 204, a threshold value storage unit 205, a data reading unit 206, a data comparison unit 207, a temporary data storage 208, and an error recording unit 209. The components 201-209 may directly or indirectly connect with each other to exchange data or signal information. The card device 20 may be an integrated chip (IC) having the above mentioned components 201-209. The units described herein may be implemented as hardware, such as integrated chips (IC) having software programs to provide predetermined functions.

The bus switch unit 201 is connected to the motherboard 10 via the $I^2C$ bus. The bus switch unit 201 receives a command comprising a device ID sent from the motherboard 10. The bus switch unit 201 connects a corresponding control card 11 to the $I^2C$ bus or disconnects the corresponding control card 11 from the $I^2C$ bus according to the device ID included in the command. For example, if the device ID included in the command is the same as the unique device ID of the corresponding control card 11, the bus switch unit 201 connects the corresponding control card 11 to the $I^2C$ bus or keeps the corresponding control card 11 connected to the $I^2C$ bus. Otherwise, if the device ID included in the command is different from the unique device ID of the corresponding control card 11, the bus switch unit 201 disconnects the corresponding control card 11 from the $I^2C$ bus or keeps the corresponding control card 11 disconnected from the $I^2C$ bus. In this manner, only one of the control cards 11 is selected to connect to the motherboard 10 via the $I^2C$ bus at a time. When a control card 11 is disconnected from the $I^2C$ bus, the corresponding bus switch unit 201 remains connected to the $I^2C$ bus to receive the commands sent from the motherboard 10.

Figure 3:
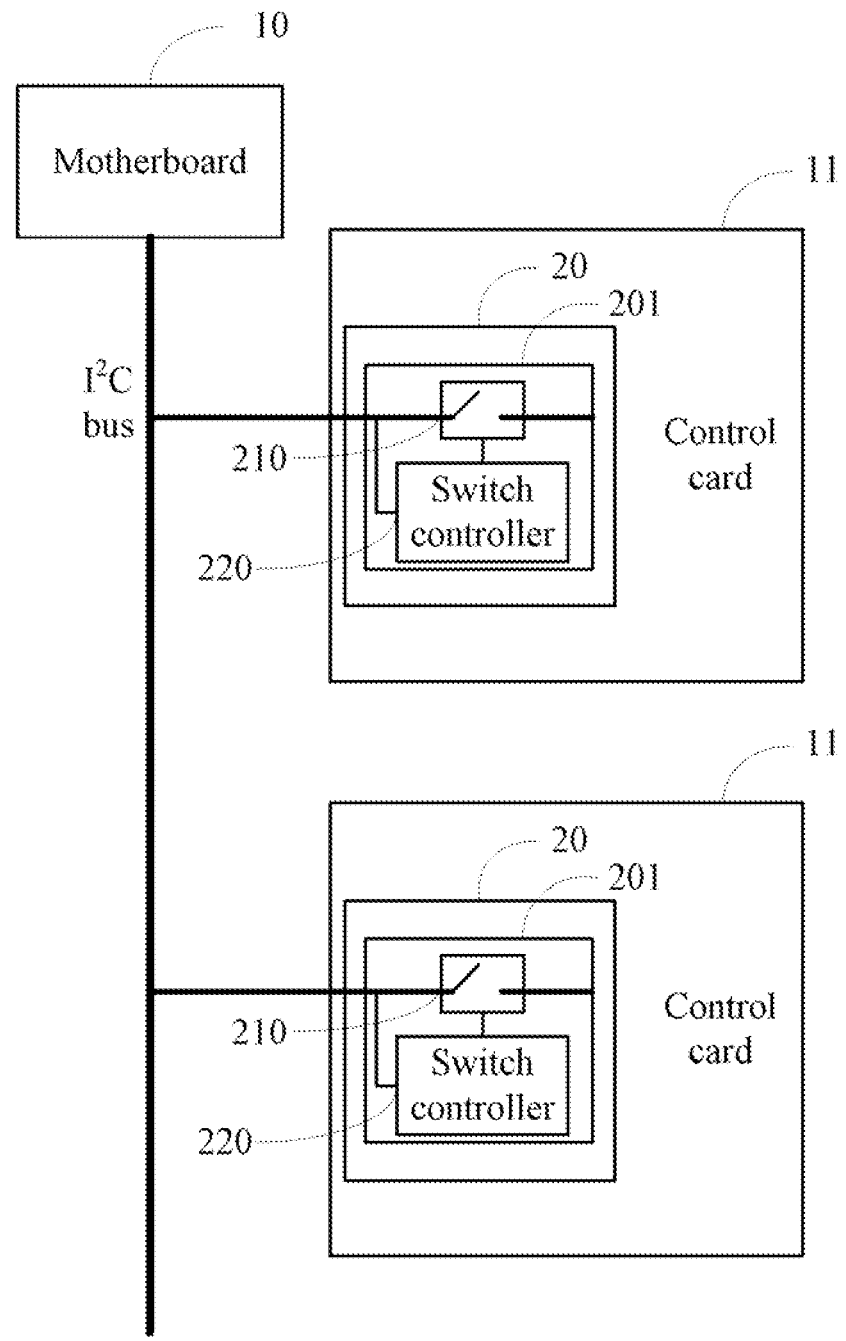
FIG. 3 illustrates a schematic diagram of a bus switch unit used to connect each of the control cards to an $I^2C$ bus.

In FIG. 3, in one embodiment, the bus switch unit 201 of each control card 11 is connected to the motherboard 10 via the $I^2C$ bus. The bus switch unit 201 includes a switch 210 and a switch controller 220. When the switch 210 is turned on according to the command, the corresponding control card 11 electrically connects to the $I^2C$ bus to connect to the motherboard 10. The switch controller 220 is connected to the $I^2C$ bus to receive the command sent from the motherboard 10. When the command is received from the motherboard 10, the switch controller 220 turns on or turns off the switch 210 according to the device ID included in the command. The unique device ID of each control card 11 is prestored in the switch controller 220. For example, the switch controller 220 first compares the device ID included in the command with the unique device ID of the corresponding control card 11. If the device ID included in the command is the same as the unique device ID of the corresponding control card 11, the switch controller 220 turns on the switch 210 to connect the corresponding control card 11 to the $I^2C$ bus. Otherwise, if the device ID included in the command is different from the unique device ID of the corresponding control card 11, the switch controller 220 turns off the switch 210 to disconnect the corresponding control card 11 from the $I^2C$ bus. Thus, the motherboard 10 is connected to only one control card 11 via the $I^2C$ bus at a time.

The format conversion unit 202 is connected to the bus switch unit 201 to connect to the $I^2C$ bus. The format conversion unit 202 converts a format of data sent from the $I^2C$ bus into a particular format supported by the card control device 20 for storing the converted data into the card control device 20. When the card control device 20 transmits data to the $I^2C$ bus, the format conversion unit 202 further converts the data into a format supported by the $I^2C$ bus.

Figure 4:
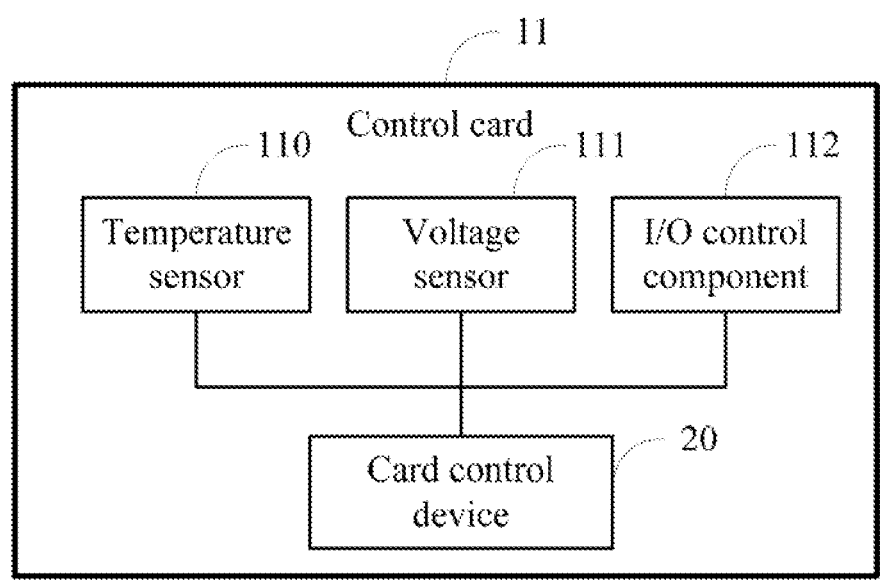
FIG. 4 illustrates a schematic diagram of a plurality of $I^2C$ components included in a control card of FIG. 1.

The address storage unit 204 is connected to the data reading unit 206 and stores bus addresses of $I^2C$ components of the corresponding control card 11. Referring to FIG. 4, in one embodiment, the $I^2C$ components of the corresponding control card 11 include a temperature sensor 110, a voltage sensor 111, and an I/O control component 112. Accordingly, the bus addresses of the $I^2C$ components include an $I^2C$ bus address of the temperature sensor 110, an I²C bus address of the voltage sensor 111, and an I²C bus address of the I/O control component 112.

The data reading unit 206 is connected between the address storage unit 204 and the temporary data storage 208. The data reading unit 206 reads monitored data (e.g., sensed temperature, voltage, and current) of each of the I²C components in real-time according to the bus address of each of the I²C components, and temporarily stores the read data in the temporary data storage 208. The temporary data storage 208 is further connected to the format conversion unit 202. The format conversion unit 202 transmits the stored data to the motherboard 10 after converting the format of the stored data. Thus, the motherboard 10 monitors a working state of the corresponding control card according to the received data from the I²C bus.

The threshold value storage unit 205 is connected to the I/O control unit 203 and is configured to store a plurality of threshold values corresponding to the monitored data of the I²C components. The threshold values are predetermined by a user and are input via an external I/O device connected to the I/O control unit 203. When the monitored data of an I²C component exceeds a corresponding threshold value, the corresponding control card 11 is determined to be in an abnormal state.

The data comparison unit 207 is connected to the temporary data storage 208, the threshold value storage unit 205, and the error recording unit 209. The data comparison unit 207 compares the monitored data of each of the I²C components stored in the temporary data storage 208 with the corresponding threshold value stored in the threshold value storage unit 205 to determine whether the monitored data exceeds the corresponding threshold value. The error recording unit 209 records the monitored data exceeding the corresponding threshold value and transmits the recorded monitored data to the motherboard 10 via the I²C bus.

The I/O control unit 203 is connected to the data comparison unit 207 and is configured to turn on, turn off, or reset a power circuit of the corresponding control card 11. In the embodiment, when the corresponding control card 11 is determined to be in the abnormal state, the I/O control unit 203 turns off or resets the power circuit of the corresponding control card 11 to protect the corresponding control card 11.

In other embodiments, the bus switch unit 201 is connected to the I/O control unit 203. The I/O control unit 203 receives the command sent from the motherboard 10 and turns on or turns off the switch 210 of the bus switch unit 201 according to the device ID included in the command. For example, if the device ID included in the command is the same as the unique device ID of the corresponding control card 11, the I/O control unit 203 sends a first control signal (e.g., "0000") to the bus switch unit 201 to turn on the switch 210. Otherwise, if the device ID included in the command is different from the unique device ID of the corresponding control card 11, the I/O control unit 203 sends a second control signal (e.g., "0001") to the bus switch unit 201 to turn off the switch 210.

As described above, the computer system 100 can monitor a plurality of control cards 11 using a single I²C bus. Thus, a required space on the motherboard 10 for I²C buses is significantly reduced. Further, since each control card 11, rather than a CPU, monitors its own data and feeds back the monitored data to the motherboard 10, a workload of the CPU is also reduced.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A card control device of a control card of a computer system, the control card having a unique device identification (ID) and being monitored by at least one motherboard of the computer system via an inter-integrated circuit (I²C) bus, the card control device comprising:

a plurality of I²C components monitoring real-time data of the control card;

a bus switch unit connected to the at least one motherboard via the I²C bus receiving a command comprising a device ID sent from the at least one motherboard, and connecting or disconnecting the control card to the I²C bus according to the device ID included in the command;

an address storage unit storing bus addresses of the I²C components of the control card;

a data reading unit connected to the address storage unit reading monitored data of each of the I²C components at real-time according to the bus address of each of the I²C components stored in the address storage unit;

a temporary data storage connected to the data reading unit temporarily storing the read data, wherein the stored data is acquired by the at least one motherboard via the I²C bus to monitor the control card;

a threshold value storage unit is configured to store a plurality of threshold values respectively corresponding to the monitored data of the I²C components;

a data comparison unit is connected to the threshold value storage unit and is configured to compare the monitored data of each of the I²C components stored in the temporary data storage with a corresponding threshold value stored in the threshold value storage unit to determine whether the monitored data exceeds the corresponding threshold value; and an error recording unit is connected to the data comparison unit and is configured to record the monitored data exceeding the corresponding threshold value, and to transmit the recorded data to the at least one motherboard via the I²C bus.

2. The card control device according to claim 1, further comprising a format conversion unit connected to the bus switch unit to connect to the I²C bus, wherein the format conversion unit is configured to convert a format of data sent from the I²C bus into a particular format supported by the card control device, and to convert data of the card control device to be transmitted via the I²C bus into a format supported by the I²C bus.

3. The card control device according to claim 2, wherein the temporary data storage is connected to the format conversion unit to transmit the data stored in the temporary data storage to the at least one motherboard via the I²C bus after the format of the data is converted by the format conversion unit.

4. The card control device according to claim 1, further comprising an input/output (I/O) control unit connected to the data comparison unit and is configured to turn on, turn off, or reset a power circuit of the control card.

5. The card control device according to claim 4, wherein when the monitored data of an I²C component of the control card exceeds a corresponding threshold value, the I/O control unit turns off or resets the power circuit of the corresponding control card to protect the control card.

6. The card control device according to claim 1, wherein the bus switch unit comprises a switch and a switch controller connected to the I²C bus to receive the command sent from the at least one motherboard; when the device ID included in the command is the same as the unique ID of the control card, the switch controller turns on the switch to connect the control card to the I²C bus; when the device ID included in the command is different from the unique ID of the control card, the switch controller turns off the switch to disconnect the control card from the I²C bus.

7. A control card of a computer system connected to at least one motherboard of the computer system, the control card having a unique device identification (ID) and comprising a card control device, the card control device comprising:
- a plurality of I²C components monitoring real-time data of the control card;
- a bus switch unit connected to the at least one motherboard via the I²C bus receiving a command comprising a device ID sent from the at least one motherboard, and connecting or disconnecting the control card to the I²C bus according to the device ID included in the command;
- an address storage unit storing bus addresses of the I²C components of the control card;
- a data reading unit connected to the address storage unit reading monitored data of each of the I²C components at real-time according to the bus address of each of the I²C components stored in the address storage unit;
- a temporary data storage connected to the data reading unit temporarily storing the read data, wherein the stored data is acquired by the at least one motherboard via the I²C bus to monitor the control card; and
- wherein the card control device further comprises a threshold value storage unit, a data comparison unit, and an error recording unit; the threshold value storage unit is configured to store a plurality of threshold values respectively corresponding to the monitored data of the I²C components; the data comparison unit is connected to the threshold value storage unit and is configured to compare the monitored data of each of the I²C components stored in the temporary data storage with a corresponding threshold value stored in the threshold value storage unit to determine whether the monitored data exceeds the corresponding threshold value; and the error recording unit is connected to the data comparison unit and is configured to record the monitored data exceeding the corresponding threshold value, and to transmit the recorded data to the at least one motherboard via the I²C bus.

8. The control card according to claim 7, wherein the card control device further comprises a format conversion unit connected to the bus switch unit to connect to the I²C bus, the format conversion unit is configured to convert a format of data sent from the I²C bus into a particular format supported by the card control device, and to convert data of the card control device to be transmitted via the I²C bus into a format supported by the I²C bus.

9. The control card according to claim 8, wherein the temporary data storage is connected to the format conversion unit to transmit the data stored in the temporary data storage to the at least one motherboard via the I²C bus after the format of the data is converted by the format conversion unit.

10. The control card according to claim 7, wherein the card control device further comprises an input/output (I/O) control unit connected to the data comparison unit and is configured to turn on, turn off, or reset a power circuit of the control card.

11. The control card according to claim 10, wherein when the monitored data of an I²C component of the control card exceeds a corresponding threshold value, the I/O control unit turns off or resets the power circuit of the corresponding control card to protect the control card.

12. The control card according to claim 7, wherein the bus switch unit comprises a switch and a switch controller connected to the I²C bus to receive the command sent from the at least one motherboard; when the device ID included in the command is the same as the unique ID of the control card, the switch controller turns on the switch to connect the control card to the I²C bus; when the device ID included in the command is different from the unique ID of the control card, the switch controller turns off the switch to disconnect the control card from the I²C bus.

13. A computer system, comprising:
at least one mother board and a plurality of control cards monitored by the at least one motherboard via an inter integrated circuit (I²C) bus, each control card having a unique identification (ID) and comprising:
- a plurality of I²C components monitoring real-time data of a corresponding control card;
- a bus switch unit connected to the at least one motherboard via the I²C bus receiving a command comprising a device ID sent from the at least one motherboard, and connecting or disconnecting the corresponding control card to the I²C bus according to the device ID included in the command;
- an address storage unit storing bus addresses of the I²C components of the corresponding control card;
- a data reading unit connected to the address storage unit reading monitored data of each of the I²C components at real-time according to the bus address of each of the I²C components stored in the address storage unit;
- a temporary data storage connected to the data reading unit temporarily storing the read data, wherein the stored data is acquired by the at least one motherboard via the I²C bus to monitoring the corresponding control card; and
- wherein the card control device further comprises a threshold value storage unit, a data comparison unit, and an error recording unit; the threshold value storage unit is configured to store a plurality of threshold values respectively corresponding to the monitored data of the I²C components; the data comparison unit is connected to the threshold value storage unit and is configured to compare the monitored data of each of the I²C components stored in the temporary data storage with a corresponding threshold value stored in the threshold value storage unit to determine whether the monitored data exceeds the corresponding threshold value; and the error recording unit is connected to the data comparison unit and is configured to record the monitored data exceeding the corresponding threshold value, and to transmit the recorded data to the at least one motherboard via the I²C bus.

14. The computer system according to claim 13, wherein the card control device further comprises a format conversion unit connected to the bus switch unit to communicate with the I²C bus via the bus switch unit; the format conversion unit is configured to convert a format of data sent from the I²C bus into a particular format supported by the corresponding card control device, and to convert data of the corresponding card control device to be transmitted via the I²C bus into a format supported by the I²C bus.

15. The computer system according to claim 13, wherein the bus switch unit comprises a switch and a switch controller connected to the I²C bus to receive the command sent from the at least one motherboard; when the device ID included in the command is the same as the unique ID of the corresponding control card, the switch controller turns on the switch to connect the corresponding control card to the I²C bus; when the device ID included in the command is different from the unique ID of the corresponding control card, the switch controller turns off the switch to disconnect the corresponding control card from the I²C bus.

16. The computer system according to claim 13, wherein the plurality of control cards comprise an audio card, a graphic card, and network card, of the computer system.

* * * * *